United States Patent
Pollakowski et al.

(10) Patent No.: US 12,267,223 B2
(45) Date of Patent: Apr. 1, 2025

(54) MANAGING NOTIFICATIONS FOR COMMUNICATION SURVEILLANCE

(71) Applicant: NOKIA TECHNOLOGIES OY, Espoo (FI)

(72) Inventors: Olaf Pollakowski, Berlin (DE); Jing Ping, Sichuan (CN); Anatoly Andrianov, Schaumburg, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/637,997

(22) PCT Filed: Sep. 6, 2019

(86) PCT No.: PCT/CN2019/104795
§ 371 (c)(1),
(2) Date: Feb. 24, 2022

(87) PCT Pub. No.: WO2021/042393
PCT Pub. Date: Mar. 11, 2021

(65) Prior Publication Data
US 2022/0278916 A1    Sep. 1, 2022

(51) Int. Cl.
*H04L 43/10* (2022.01)
*H04L 41/06* (2022.01)

(52) U.S. Cl.
CPC .............. *H04L 43/10* (2013.01); *H04L 41/06* (2013.01)

(58) Field of Classification Search
CPC ....... H04L 43/10; H04L 41/06; H04L 43/103; Y02D 30/70
See application file for complete search history.

(56) References Cited

U.S. PATENT DOCUMENTS 7,280,533 B2* 10/2007 Khartabil ............ H04L 65/1104
370/352
2007/0156870 A1* 7/2007 McCollum .............. H04L 43/10
709/223

(Continued)

FOREIGN PATENT DOCUMENTS

CN          103002488 A     3/2013
WO     WO 2012/174836 A1   12/2012

OTHER PUBLICATIONS

3GPP TSG SA, "3rd Generation Partnership Project; Technical Specification Group Services and System Aspects; Management and orchestration, Heartbeat (Release 16)", 3GPP TR 28.aaa V0.0.0, Aug. 2019.

(Continued)

*Primary Examiner* — Oanh Duong
(74) *Attorney, Agent, or Firm* — SQUIRE PATTON BOGGS (US) LLP

(57) ABSTRACT

Systems, methods, apparatuses, and computer program products for the management of heartbeat notifications, for instance, in a service based management architecture are provided. One method may include receiving, from a first entity, information comprising one or more attributes relating to management of an emission of heartbeat notifications at a second entity. The method may also include associating, by the second entity, the attributes with a subscription, associating the attributes with a communication channel between the second entity and a third entity relating to the subscription, and starting the emission of the heartbeat notifications according to the information received by the second entity from the first entity.

23 Claims, 5 Drawing Sheets

(56) References Cited

U.S. PATENT DOCUMENTS

| | | | |
|---|---|---|---|
| 2009/0037573 A1* | 2/2009 | Qiu | H04L 41/0663 709/224 |
| 2010/0185901 A1* | 7/2010 | Hirsch | H04Q 3/0062 709/224 |
| 2012/0290749 A1* | 11/2012 | Moench | H04L 67/565 710/63 |
| 2020/0175125 A1* | 6/2020 | Erbe | G06F 30/20 |
| 2021/0306211 A1* | 9/2021 | Landais | H04L 43/20 |

OTHER PUBLICATIONS

International Search Report and Written Opinion dated Jun. 5, 2020 corresponding to International Patent Application No. PCT/CN2019/104795.

AT & T et al, "pCR TS 28.aaa—Hearbeat MnS—Stage 1—MnS's and procedures," 3GPP Draft; S5-195085, 3GPP TSG SA WG5 (Telecom Management) Meeting #126, Bruges, Belgium, Aug. 9, 2019.

AT & T et al., "Add NRM fragment supporting the management of notification subscriptions," 3GPP Draft, S5-195086, 3GPP TSG-SA5 Meeting # 126, Bruges, Belgium, Aug. 9, 2019.

3GPP TS 32.302 V15.0.0 (Jun. 2018), Technical Specification, 3rd Generation Partnership Project; Technical Specification Group Services and System Aspects; Telecommunication management; Configuration Management (CM); Notification Integration Reference Point (IRP); Information Service (IS) (Release 15), Jun. 2018.

3GPP TS 32.352 V15.0.0 (Jun. 2018), Technical Specification, 3rd Generation Partnership Project; Technical Specification Group Services and System Aspects; Telecommunication management; Communication Surveillance (CS) Integration Reference Point (IRP); Information Service (IS) (Release 15), Jun. 2018.

* cited by examiner

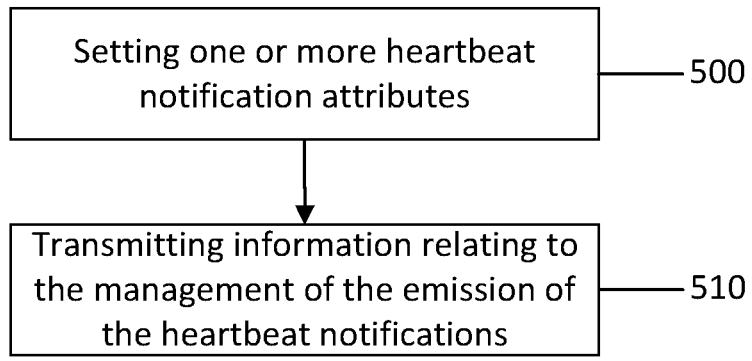
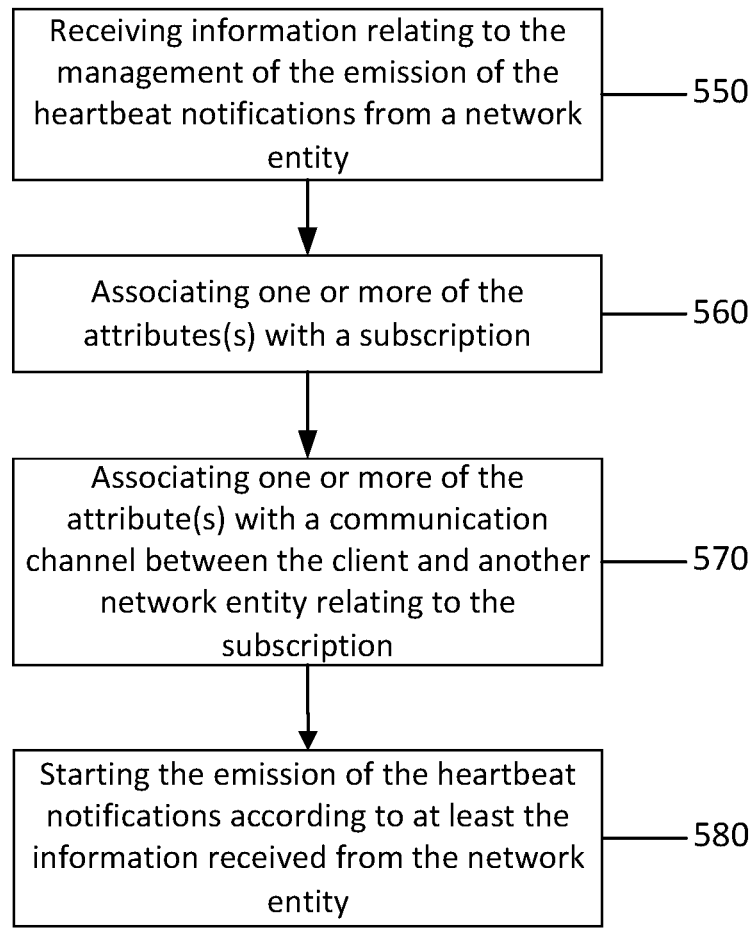

MANAGING NOTIFICATIONS FOR COMMUNICATION SURVEILLANCE

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems, apparatuses and/or methods for managing heartbeat notifications for communication surveillance, for instance, in a service based management architecture.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

One embodiment is directed to a method, which may include receiving, from a first entity, information comprising one or more attributes relating to management of an emission of heartbeat notifications at a second entity. The method may also include associating, by the second entity, the attributes with a subscription, associating, by the second entity, the attributes with a communication channel between the second entity and a third entity relating to the subscription, and starting the emission of the heartbeat notifications according to the information received by the second entity from the first entity.

Another embodiment is directed to an apparatus that may include at least one processor and at least one memory comprising computer program code. The at least one memory and computer program code configured, with the at least one processor, to cause the apparatus at least to receive, from a network entity, information comprising one or more attributes relating to management of an emission of heartbeat notifications, associate the attributes with a subscription, associate the attributes with a communication channel between the apparatus and an another network entity relating to the subscription, and start the emission of the heartbeat notifications according to the information received from the network entity.

Another embodiment is directed to an apparatus that may include means for receiving, from a network entity, information comprising one or more attributes relating to management of an emission of heartbeat notifications, means for associating the attributes with a subscription, means for associating the attributes with a communication channel between the apparatus and an another network entity relating to the subscription, and means for starting the emission of the heartbeat notifications according to the information received from the network entity.

Another embodiment is directed to an apparatus that may include circuitry configured for receiving, from a network entity, information comprising one or more attributes relating to management of an emission of heartbeat notifications, circuitry configured for associating the attributes with a subscription, circuitry configured for associating the attributes with a communication channel between the apparatus and an another network entity relating to the subscription, and circuitry configured for starting the emission of the heartbeat notifications according to the information received from the network entity.

Another embodiment is directed to a computer readable medium comprising program instructions for causing an apparatus to perform at least the following: receiving, from a network entity, information comprising one or more attributes relating to management of an emission of heartbeat notifications, associating the attributes with a subscription, associating the attributes with a communication channel between the apparatus and an another network entity relating to the subscription, and starting the emission of the heartbeat notifications according to the information received from the network entity.

BRIEF DESCRIPTION OF THE DRAWINGS

For proper understanding of example embodiments, reference should be made to the accompanying drawings, wherein:

FIG. 5a illustrates an example flow diagram of a method, according to an embodiment;

FIG. 5b illustrates an example flow diagram of a method, according to another embodiment;

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for the management of heartbeat notifications in a service based management architecture, is not intended to limit the scope of certain embodiments but is representative of some selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

When notifications are sent from a sending entity A (e.g., an Element Manager) to a receiving entity B (e.g., a Network Manager) over a specific reference point (e.g., the Itf-N reference point), it may be desirable to determine with a certain frequency if the communication channel between the sending entity A and the receiving entity B is working properly. Such a determination may be typically done using "dummy" notifications that are sent from the sending entity A to the receiving entity B with a certain frequency. These "dummy" notifications are so called because they carry no information in the payload. Such "dummy" notifications may be regularly emitted notifications and may also be referred to herein as "heartbeat notifications."

Figure 1:
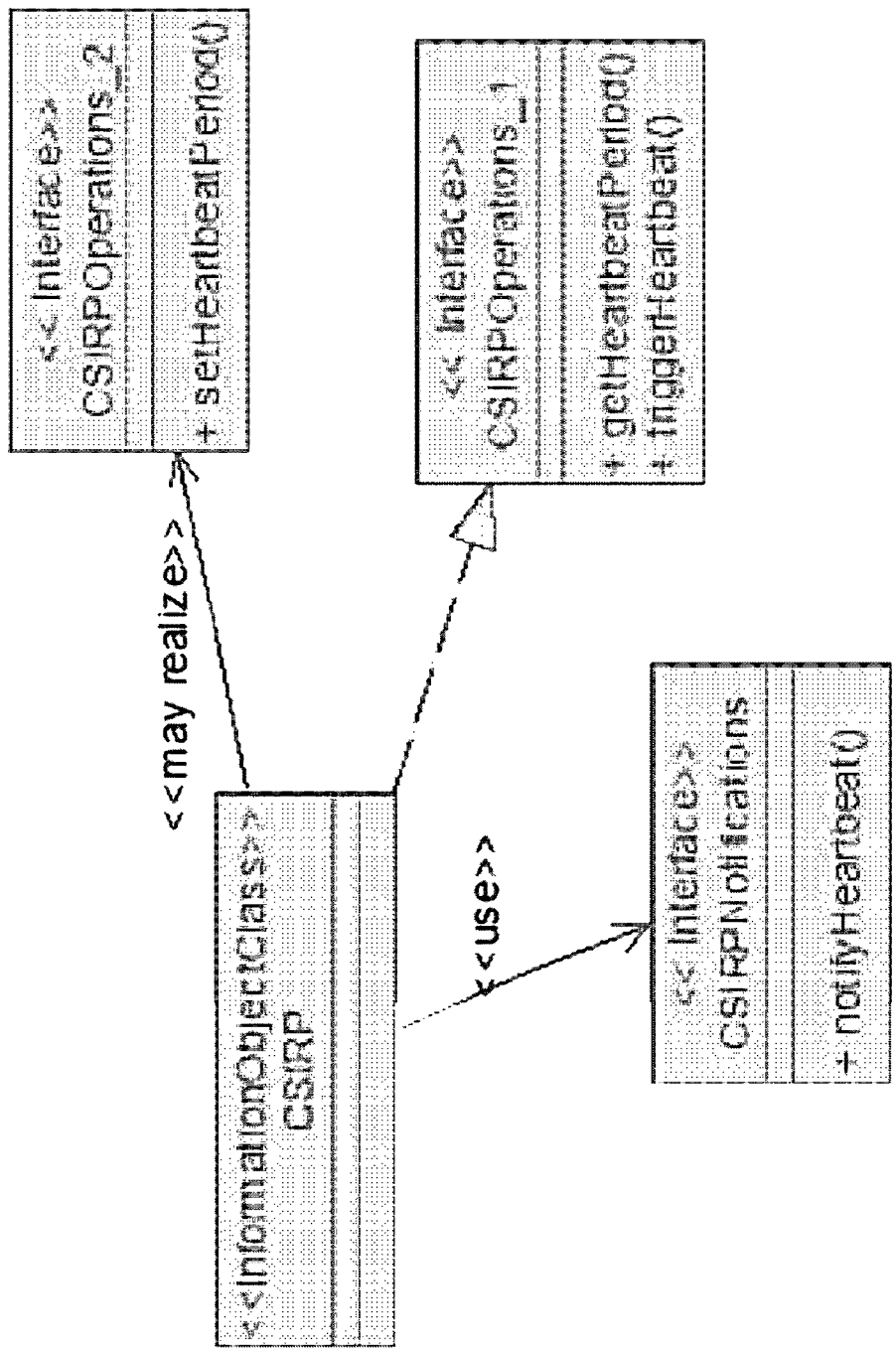
FIG. 1 illustrates an example of legacy communication surveillance interfaces.

The management of heartbeat notification emissions is typically performed by a receiving entity B using dedicated operations invoked on a sending entity A. For example, the dedicated operations may include: "getHeartBeatPeriod", "triggerHeartbeat", "setHeartbeatPeriod", and "notifyHeartbeat," as outlined for example in section 6.1 of 3GPP TS 32.352. FIG. 1 illustrates an example of the legacy communication surveillance interfaces using the dedicated operations mentioned above.

Figure 2:
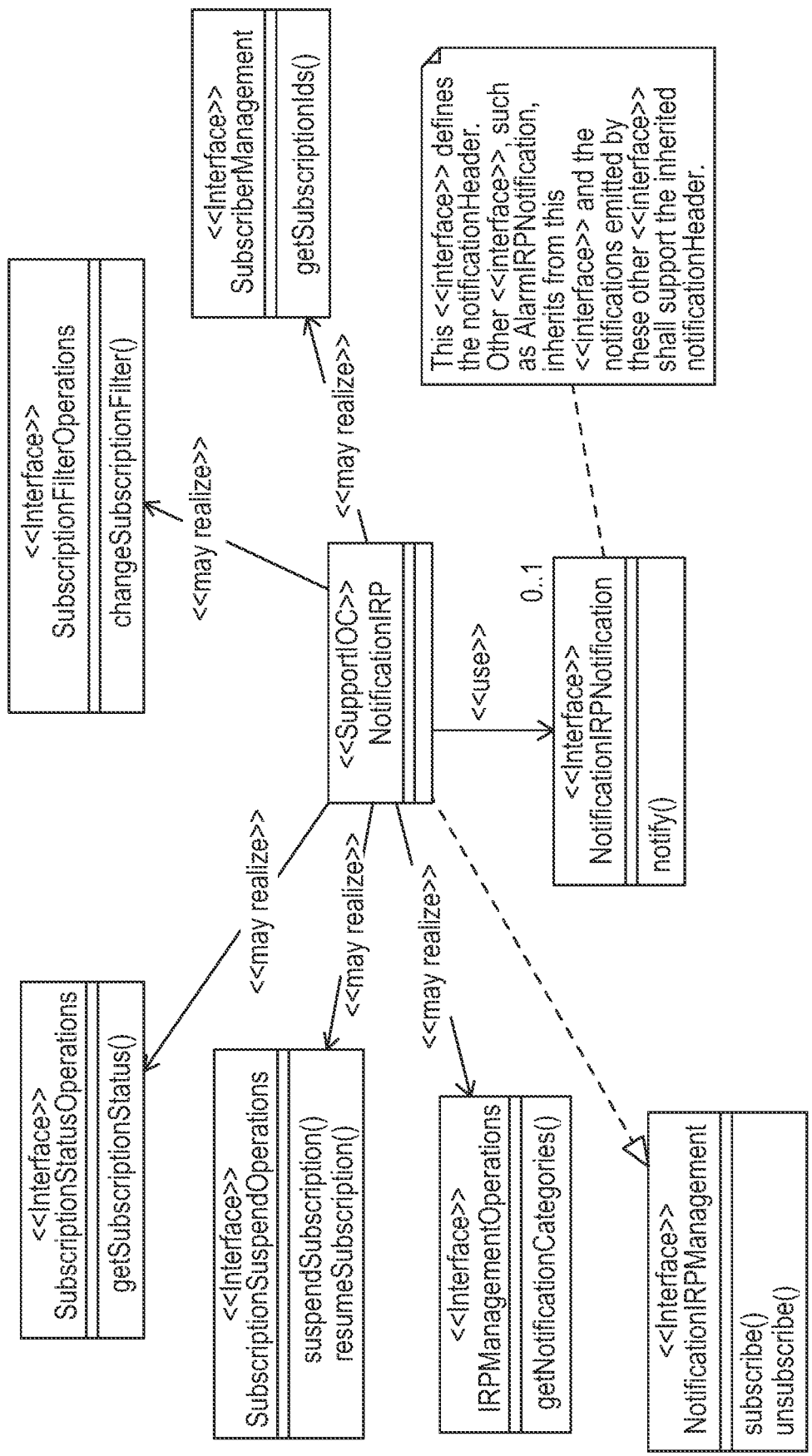
FIG. 2 illustrates an example of the legacy notification interfaces.

Typically, to subscribe to heartbeat notifications, dedicated operations such as "subscribe" and "unsubscribe" are used. FIG. 2 illustrates an example of the legacy notification interfaces, as outlined in section 6.1 of 3GPP TS 32.302. It is noted that this approach can be well suited for a reference-point based architecture, where notifications are sent across a reference point from one entity to another (or a few others) and where the connection between these entities shall be checked with heartbeat notifications.

However, for 5G management, a Service Based Management Architecture (SBMA) is used. In addition, for 5G, a strictly model driven approach is followed, where only create, read, update, delete (CRUD) operations are used by the client to manipulate the network resource model (NRM) on the server side and no task specific operations. The client may also be called a management service (MnS) consumer, and the server may be called a MnS producer. Following this approach, a so-called NRM fragment for supporting the management of notification subscriptions is currently under discussion. This NRM fragment may include a new object class of "NotificationSubscription," which may be defined as illustrated in the example of FIG. 3.

Figure 3:
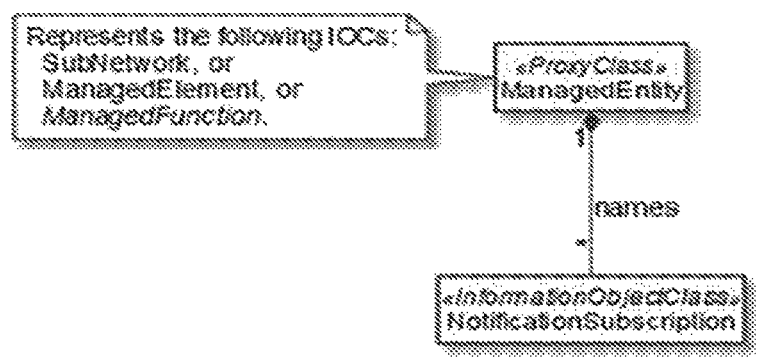
FIG. 3 illustrates an example "NotificationSubscription" object class, according to an embodiment.

For example, as depicted in FIG. 3, this information object class (IOC) represents the capabilities that instances of the IOCs SubNetwork, ManagedElement and ManagedFunction (and their sub-classes) have with regard to sending notifications. Table 1 below shows examples of the "NotificationSubscription" attributes, which may include notificationRecipientAddress, notificationType, notificationFormat, notificationFilter, and timeTrick.

TABLE 1

| Attribute Name | Support Qualifier | isReadable | isWritable | isInvariant | isNotifyable |
|---|---|---|---|---|---|
| notificationRecipientAddress | M | T | T | F | T |
| notificationType | M | T | T | F | T |
| notificationFormat | M | T | F | F | T |
| notificationFilter | M | T | T | F | T |
| timeTick | M | T | T | F | T |

As will be discussed below, the conventional approach has several problems if applied in the environment of SBMA and model driven management. Example embodiments therefore provide new methods for heartbeat notification management addressing at least the shortcomings in conventional approaches.

For 4G (and earlier generations), there is provided on the server side a dedicated access point that receives all requests for notification subscriptions. The business logic behind this access point processes these requests and can easily maintain a list with all subscriber addresses to which notifications are to be sent. For this reason, it is also easy to send heartbeat notifications to all subscribers, assuming they subscribed for this notification type.

In 5G, however, the knowledge about subscriptions is distributed. Notification subscription objects can be name contained by almost any managed object in the containment tree. As such, there is not a single place where all subscriber addresses are stored. As a result, the conventional approach used prior to 5G for central heartbeat notification management does not fit into the new paradigm for decentralized notification subscription management. Example embodiments provide methods that can be applied in the decentralized environment of 5G or other SBMA.

Certain embodiments may be configured to distribute the heartbeat notification management and to bring it to the place where notification subscription management is done. Additionally, some embodiments may be configured to link the heartbeat notification to a specific subscription and thereby to the communication channel of the subscriber related to that subscription. Hence, according to certain embodiments, each subscription may have its own associated heartbeat management controlling the heartbeat notification emission. In other words, in an embodiment, there is no longer just one heartbeat management function that controls the heartbeat notification emission for all subscriptions on one, more or all instances of a specific reference point.

According to an embodiment, to design a NRM fragment for heartbeat notification management, one or more heartbeat management attributes may be defined. For instance, the attributes may include one or more of: attributes describing the periodicity of the heartbeat notification emission, attributes scheduling the emission of heartbeat notifications, attributes storing a count-down timer indicating the time to the next heartbeat notification emission, attributes specifying to trigger an immediate heartbeat notification emission, attributes specifying an address that the heartbeat notifications are to be sent to, attributes turning on, turning off, suspending and/or resuming the emission of heartbeat notifications, and/or attributes used for monitoring the state of the heartbeat notification emission function. In an embodiment, the heartbeat management attribute(s) may be expressed as name-value pairs and/or key-value pairs (KVPs), for example. At least some of these attributes are control attributes that allow for a finer and subscription independent control of the heartbeat notification emission.

In some examples, 3GPP may specify the NRM and NRM fragments, which may contain standardized heartbeat management attributes. According to certain embodiments, this process may include the specification of a NRM class diagram, managed object classes and their attributes, as discussed in more detail below. In addition, a vendor may define additional attributes (e.g., "vendor-extension" attributes) that may serve a similar purpose.

In certain embodiments, a first network entity may be configured to transmit information relating to the management of the emission of heartbeat notifications to a second network entity. The information transmitted to the second network entity may include one or more of the heartbeat management attributes defined above. In an embodiment, in addition to the attributes, the information sent by the first entity may also include information identifying the subscription that the attributes relate to.

According to some embodiments, the first network entity may be a client, such as a management service consumer. Similarly, in some embodiments, the second network entity may be a server, such as a management service producer, a network function, a network element or a management function.

When the second network entity receives the information including the attribute(s) from the first network entity, the second network entity may be configured to associate one or more of the attributes(s) with a subscription. For example, in an embodiment, the attribute(s) may be associated to a subscription object in a class diagram describing the managed network. One embodiment may be configured to group the attribute(s) in a heartbeat object which is linked to the subscription object, for example, by name containing it under the subscription object or by having a relationship between the heartbeat object and the subscription object.

In an embodiment, the second network entity may be further configured to associate one or more of the attribute(s) with a communication channel between the second network entity and a third network entity relating to the subscription. According to certain embodiments, the third network entity may be a subscriber, such as a management service consumer, a network function, a network element or a management function. As a result of the second network entity associating the attribute(s) with a subscription and/or a communication channel, heartbeat notification(s) are linked to a specific subscription and/or to the communication channel between the second network entity and the subscriber (e.g., third network entity) related to that subscription.

According to certain embodiments, the second network entity may also be configured to start the emission of the heartbeat notifications according to the information received by the second network entity from the first network entity. In other words, the second network entity may be configured to use the attribute(s) received from the first network entity to determine when and how to start emitting the heartbeat notifications.

In one embodiment, a count-down timer may be utilized to schedule the emission of the heartbeat notification(s). For example, according to this embodiment, the second network entity may be configured to start a count-down timer and, when the timer expires, the second network entity may be configured to emit a heartbeat notification. The second network entity may then be configured to reset the timer to a value of the attribute that defines the periodicity of the heartbeat notification emission.

According to some embodiments, the information received from the first network entity may include an identification of heartbeat notification information to be deleted. In this case, the second network entity may be configured to delete the identified heartbeat notification information, and to stop the emission of heartbeat notifications.

In another embodiment, the information received from the first network entity may include appropriate values for the attributes for turning off the emission of heartbeat notifications. In this case, the second network entity may be configured to stop the emission of heartbeat notifications based on the received values.

According to certain embodiments, the information received from the first network entity may include appropriate values for the attributes scheduling the emission of heartbeat notifications. In this case, the second network entity may be configured to suspend the emission of heartbeat notifications based on the received values.

Further, in some embodiments, the subscription object related to a heartbeat object may be reconfigured to stop or suspend heartbeat notification emission.

As discussed above, in certain embodiments, the attributes received from the first network entity may include attributes that specify the address that heartbeat notifications should be sent to. According to some embodiments, it may be desirable to send heartbeat notifications to an address that is different from an address that other notifications are sent to. In one example, this different address does not necessarily need to identify a completely different server or entity, but may just reference some other location in the server/entity. For instance, in certain embodiments, heartbeat notifications may be sent to a different uniform resource identifier (URI) than, e.g., alarm notifications. As an example, the URIs for the notifications may differ in the path component and the host component may be the same.

Figure 4:
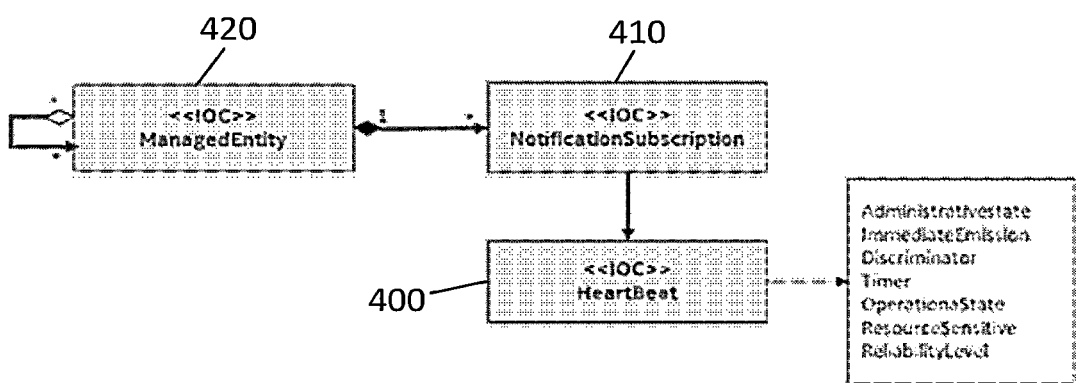
FIG. 4 illustrates an example of a network resource model (NRM) class diagram, according to one embodiment.

FIG. 4 illustrates an example of a NRM class diagram, according to one embodiment. As illustrated in the example of FIG. 4, so called potential heartbeat notifications may be emitted by the heartbeat object 400 that are processed and forwarded by its related subscription object 410. In an embodiment, when heartbeat notifications are subscribed to, potential heartbeat notifications may be forwarded to the subscriber as heartbeat notifications. In one embodiment, the heartbeat management attributes may be added to the subscription object 410. According to certain embodiments, the subscription related attributes may be added to the managed object 420 whose notifications are subscribed to and link the heartbeat object to that managed object 420. In another embodiment, the subscription related object 410 and the heartbeat related object 400 may be added to the managed object 420 whose notifications are subscribed to.

In view of the above according to an embodiment, a subscriber may subscribe to receiving notifications and heartbeat notifications. For example, the subscriber may create a subscription object indicating at least the address notifications should be sent to and the subscriber may then create a heartbeat object. In another embodiment, the subscriber may unsubscribe from receiving notifications and heartbeat notifications by deleting the heartbeat object and deleting the subscription object. In yet another embodiment, the subscriber may unsubscribe from receiving heartbeat notifications by deleting the heartbeat object or reconfiguring the subscription object in a way that potential heartbeat notifications are not forwarded.

FIG. 5a illustrates an example flow diagram for managing or controlling the emission of heartbeat notifications in a network, according to one example embodiment. In certain example embodiments, the flow diagram of FIG. 5a may be performed by a network entity or network node in a communication system, such as LTE or 5G NR. For instance, in some example embodiments, the method of FIG. 5a may be performed by a base station, gNB and/or client, such as a management service consumer.

As illustrated in the example of FIG. 5a, the method may include, at 500, setting one or more heartbeat notification attributes. For example, the attributes may include one or more of: attributes describing the periodicity of the heartbeat notification emission, attributes scheduling the emission of heartbeat notifications, attributes storing a count-down timer indicating the time to the next heartbeat notification emission, attributes specifying to trigger an immediate heartbeat notification emission, attributes specifying an address that the heartbeat notifications are to be sent to, attributes turning on, turning off, suspending and/or resuming the emission of heartbeat notifications, and/or attributes used for monitoring the state of the heartbeat notification emission function. It should be noted that example embodiments are not limited to just these attributes, as other attributes may be defined according to certain embodiments.

In an embodiment, the method of FIG. 5a may also include, at 510, transmitting information relating to the management of the emission of the heartbeat notifications to a second network entity. The information transmitted to the second network entity may include one or more of the heartbeat management attributes defined at 500. In some embodiments, the second network entity may be a server, such as a management service producer, a network function, a network element or a management function.

FIG. 5b illustrates an example flow diagram for managing or controlling the emission of heartbeat notifications in a network, according to an example embodiment. In certain example embodiments, the flow diagram of FIG. 5b may be performed by a network entity or network node in a communication system, such as LTE or 5G NR. For instance, in some example embodiments, the method of FIG. 5b may be performed by a server, such as a management service producer, a network function, a network element or a management function.

As illustrated in the example of FIG. 5b, the method may include, at 550, receiving information relating to the management of the emission of the heartbeat notifications from a network entity. The information received from the network entity may include one or more of the heartbeat management attributes defined above.

In an embodiment, the method may also include, at 560, associating one or more of the attributes(s) with a subscription. For example, in an embodiment, the attribute(s) may be associated to a subscription object in a class diagram describing the managed network. Some embodiments may be configured to group the attribute(s) in a heartbeat object which is linked to the subscription object, for example, by name containing it under the subscription object or by having a relationship between the heartbeat object and the subscription object.

According an embodiment, the method may further include, at 570, associating one or more of the attribute(s) with a communication channel between the client and another network entity relating to the subscription. According to certain embodiments, the other network entity may be a subscriber, such as a management service consumer, a network function, a network element or a management function. As a result of the associating of the attribute(s) with a subscription and/or a communication channel, heartbeat notification(s) are linked to a specific subscription and/or to the communication channel between the client and the subscriber (e.g., the other network entity) related to that subscription.

According to certain embodiments, the method may further include, at 580, starting the emission of the heartbeat notifications according to at least the information received from the network entity at 550. In other words, the method may include utilizing the attribute(s) received from the network entity to determine when and how to start emitting the heartbeat notifications.

In one embodiment, the starting 580 may include utilizing a count-down timer to schedule the emission of the heartbeat notification(s). For example, according to this embodiment, the method may include starting a count-down timer and, when the timer expires, emitting a heartbeat notification. The method may then include resetting the timer to a value of the attribute that defines the periodicity of the heartbeat notification emission.

According to some embodiments, the information received from the network entity at 550 may include an identification of heartbeat notification information to be deleted. In this case, the method may include deleting the identified heartbeat notification information, and stopping the emission of heartbeat notifications.

In another embodiment, the information received from the network entity at 550 may include appropriate values for the attributes for turning off the emission of heartbeat notifications. In this case, the method may include stopping the emission of heartbeat notifications based on the received values.

According to certain embodiments, the information received from the network entity at 550 may include appropriate values for the attributes scheduling the emission of heartbeat notifications. In this case, the method may include suspending the emission of heartbeat notifications based on the received values. Further, in some embodiments, the method may include reconfiguring the subscription object related to a heartbeat object to stop or suspend heartbeat notification emission.

Figure 6A:
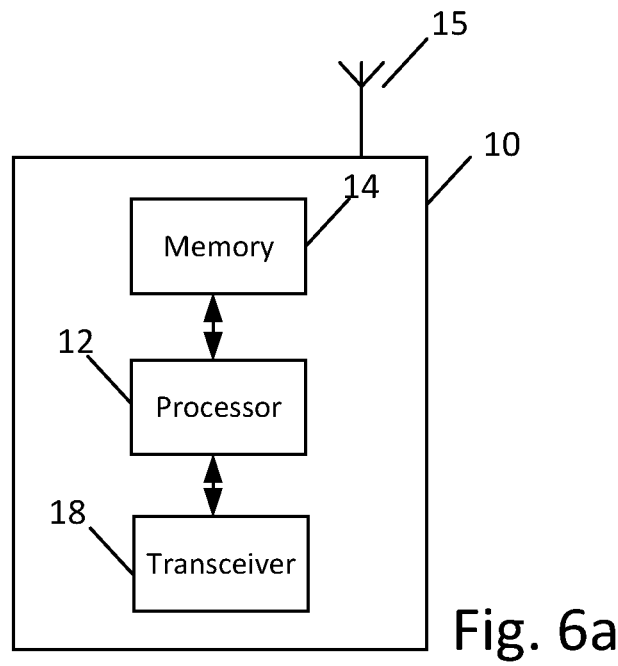
FIG. 6a illustrates an example block diagram of an apparatus, according to an embodiment.

FIG. 6a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), CU of a gNB, WLAN access point, serving gateway (SGW), mobility management entity (MME), a data management entity (e.g., UDM), or other entity associated with a radio access network, such as 5G or NR. In one example, apparatus 10 may represent a client or management service consumer.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). It is noted that, according to certain embodiments, the inclusion of antenna(s) 15 may be optional.

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or entity, such as a client or management service consumer, or the like. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the flow chart of FIG. 5a. For instance, in certain embodiments, apparatus 10 may be configured to perform a procedure for managing or controlling the emission of heartbeat notifications in a network.

In an embodiment, apparatus 10 may be controlled by memory 14 and processor 12 to set one or more heartbeat notification attributes. For example, the attributes may include one or more of: attributes describing the periodicity of the heartbeat notification emission, attributes scheduling the emission of heartbeat notifications, attributes storing a count-down timer indicating the time to the next heartbeat notification emission, attributes specifying to trigger an immediate heartbeat notification emission, attributes specifying an address that the heartbeat notifications are to be sent to, attributes turning on, turning off, suspending and/or resuming the emission of heartbeat notifications, and/or attributes used for monitoring the state of the heartbeat notification emission function. It should be noted that example embodiments are not limited to just these attributes, as other attributes may be defined according to certain embodiments.

In one embodiment, apparatus 10 may be controlled by memory 14 and processor 12 to transmit information relating to the management of the emission of the heartbeat notifications to a second network entity. The information transmitted to the second network entity may include one or more of the defined heartbeat management attributes. In some embodiments, the second network entity may be a server, such as a management service producer, a network function, a network element or a management function.

Figure 6B:
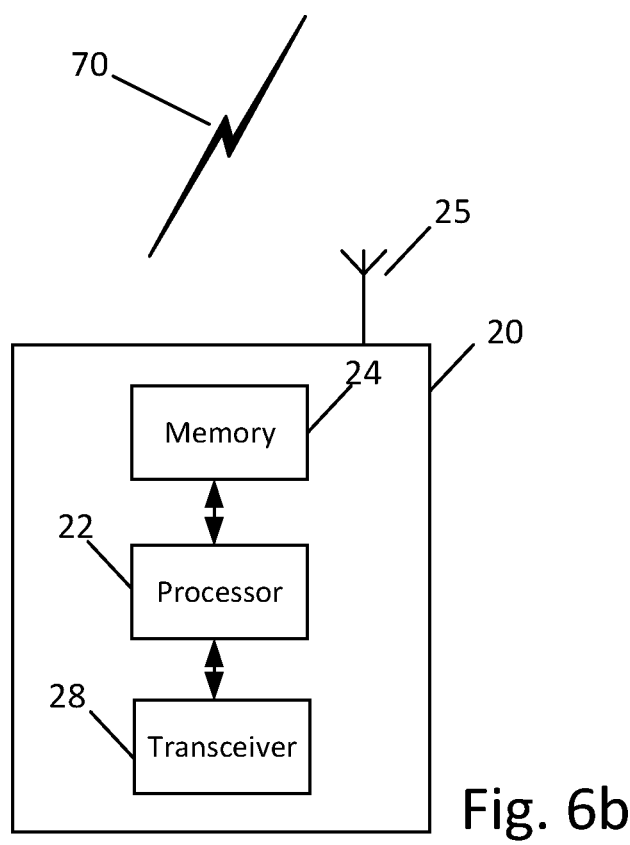
FIG. 6b illustrates an example block diagram of an apparatus, according to an embodiment.

FIG. 6b illustrates an example of an apparatus 20 according to an example embodiment. In example embodiments, apparatus 20 may be a node or server associated with a radio access network, such as a LTE network, 5G or NR or other radio systems which might benefit from an equivalent procedure. For example, apparatus 20 may be a base station, a Node B, an evolved Node B (eNB), 5G Node B or access point, next generation Node B (NG-NB or gNB), and/or DU or CU of a gNB associated with a radio access network, such as 5G or NR. In one example, apparatus 20 may represent a server, such as a management service producer, a network function, a network element or a management function.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6b.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent the Xn interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a network entity, server or client, such as a management service producer, a network function, a network element or a management function. According to certain examples, apparatus 20 may be controlled by memory 24 and processor 22 to perform the functions associated with example embodiments described herein. For instance, in some example embodiments, apparatus 20 may be configured to perform one or more of the processes depicted in any of the diagrams or signaling flow diagrams described herein, such as those illustrated in FIG. 5b. In example embodiments, apparatus 20 may be configured to perform a procedure for managing or controlling the emission of heartbeat notifications in a network.

According to certain embodiments, apparatus 20 may be controlled by memory 24 and processor 22 to receive information relating to the management of the emission of the heartbeat notifications from a network entity. In an embodiment, the network entity may be a client or management service consumer and the information received from the network entity may include one or more of the heartbeat management attributes defined above.

In an embodiment, apparatus 20 may be controlled by memory 24 and processor 22 to associate one or more of the attributes(s) with a subscription. For example, in an embodiment, the attribute(s) may be associated to a subscription object in a class diagram describing the managed network. In some embodiments, apparatus 20 may be controlled by memory 24 and processor 22 to group the attribute(s) in a heartbeat object which is linked to the subscription object, for example, by name containing it under the subscription object or by having a relationship between the heartbeat object and the subscription object.

According an embodiment, apparatus 20 may be controlled by memory 24 and processor 22 to associate one or more of the attribute(s) with a communication channel between the apparatus 20 and another network entity relating to the subscription. According to certain embodiments, the other network entity may be a subscriber, such as a management service consumer, a network function, a network element or a management function. As a result of the associating of the attribute(s) with a subscription and/or a communication channel, heartbeat notification(s) are linked to a specific subscription and/or to the communication channel between the apparatus 20 and the subscriber (e.g., the other network entity) related to that subscription.

According to certain embodiments, apparatus 20 may be controlled by memory 24 and processor 22 to start the emission of the heartbeat notifications according to at least the information received from the network entity. In other words, apparatus 20 may be controlled by memory 24 and processor 22 to utilize the attribute(s) received from the network entity to determine when and how to start emitting the heartbeat notifications.

In one embodiment, apparatus 20 may be controlled by memory 24 and processor 22 to utilize a count-down timer to schedule the emission of the heartbeat notification(s). For example, according to this embodiment, apparatus 20 may be controlled by memory 24 and processor 22 to start a count-down timer and, when the timer expires, to emit a heartbeat notification. Apparatus 20 may then be controlled by memory 24 and processor 22 to reset the timer to a value of the attribute that defines the periodicity of the heartbeat notification emission.

According to some embodiments, when the information received from the network entity includes an identification of heartbeat notification information to be deleted, apparatus 20 may be controlled by memory 24 and processor 22 to delete the identified heartbeat notification information and to stop the emission of heartbeat notifications.

In another embodiment, when the information received from the network entity includes appropriate values for the attributes for turning off the emission of heartbeat notifications, apparatus 20 may be controlled by memory 24 and processor 22 to stop the emission of heartbeat notifications based on the received values.

According to certain embodiments, when the information received from the network entity includes appropriate values for the attributes scheduling the emission of heartbeat notifications, apparatus 20 may be controlled by memory 24 and processor 22 to suspend the emission of heartbeat notifications based on the received values. Further, in some embodiments, apparatus 20 may be controlled by memory 24 and processor 22 to reconfigure the subscription object related to a heartbeat object to stop or suspend heartbeat notification emission.

Therefore, certain example embodiments provide several technological improvements, enhancements, and/or advantages over existing technological processes and constitute an improvement at least to the technological field of wireless network control and management. For example, one advantage of the example embodiments over conventional methods is that example embodiments allow for a finer and subscription independent control of the heartbeat notification emission. As a result, example embodiments can be applied in a decentralized or distributed subscription management environment, such as in a SBMA. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. A method, comprising:
receiving, at a second entity from a first entity, information identifying a subscription and information comprising one or more attributes associated with the subscription, wherein the one or more attributes relate to management of an emission of heartbeat notifications at the second entity for the subscription;
associating, by the second entity, the one or more attributes with the subscription after the receiving;
associating, by the second entity, the one or more attributes with a communication channel between the second entity and a third entity relating to the subscription; and
starting the emission of the heartbeat notifications from the second entity to the third entity according to the information identifying the subscription and the information comprising the one or more attributes received by the second entity from the first entity;
wherein the first entity, the second entity, and the third entity are different entities.

2. The method according to claim 1, wherein the information comprising the one or more attributes received from the first entity comprises at least one of attributes defining a periodicity of the heartbeat notifications of the emission;
attributes scheduling the emission of the heartbeat notifications; or
attributes specifying an address that the heartbeat notifications are to be sent to.

3. The method according to claim 2, wherein the one or more attributes comprises the attributes defining the periodicity of the heartbeat notifications, the method further comprising:
starting a count-down timer;
emitting a heartbeat notification when the count-down timer expires; and
resetting the count-down timer to a value of the attribute defining the periodicity of the heartbeat notifications.

4. The method according to claim 2, wherein the information comprising the one or more attributes received from the first entity further comprises:
attributes turning on the emission of the heartbeat notifications.

5. The method according to claim 1, wherein the first entity comprises a management service consumer.

6. The method according to claim 1, wherein the second entity comprises one of a management service producer, a network function, a network element or a management function.

7. The method according to claim 1, wherein the third entity comprises a subscriber, a network function, a network element or a management function.

8. The method according to claim 1, wherein the information comprising the one or more attributes received from the first entity further comprises an identification of heartbeat notification information to be deleted, and wherein the method further comprises:
deleting, by the second entity, the heartbeat notification information identified by the identification; and
stopping the emission of the heartbeat notifications by the second entity.

9. The method according to claim 1, wherein the information comprising the one or more attributes received from the first entity comprises values for turning off the emission of the heartbeat notifications, and wherein the method further comprises:
stopping the emission of the heartbeat notifications by the second entity according to the values.

10. The method according to claim 1, wherein the information comprising the one or more attributes received from the first entity comprises values for the attributes scheduling the emission of the heartbeat notifications, and wherein the method further comprises:
    suspending the emission of the heartbeat notifications by the second entity according to the values.

11. An apparatus, comprising:
    at least one processor; and
    at least one memory comprising computer program code that,
    when executed by the at least one processor, to cause the apparatus at least to:
        receive, from a first entity, information identifying a subscription and information comprising one or more attributes associated with the subscription, wherein the one or more attributes relate to management of an emission of heartbeat notifications at the second entity for the subscription;
    associate the one or more attributes with the subscription after the receiving;
    associate the one or more attributes with a communication channel between the apparatus and a second entity relating to the subscription; and
    start the emission of the heartbeat notifications from the apparatus to the second entity according to the information identifying the subscription and the information comprising the one or more attributes received from the first entity;
    wherein the first entity, the second entity, and the third entity are different entities.

12. The apparatus according to claim 11, wherein the information comprising the one or more attributes received from the first entity comprises at least one of:
    attributes defining a periodicity of the heartbeat notifications of the emission;
    attributes scheduling the emission of the heartbeat notifications; or
    attributes specifying an address that the heartbeat notifications are to be sent to.

13. The apparatus according to claim 12, wherein the computer program code is further configured to, when executed by the at least one processor, cause the apparatus to:
    when the one or more attributes comprise the attributes defining the periodicity of the heartbeat notifications;
    start a count-down timer;
    emit a heartbeat notification when the count-down timer expires; and
    reset the count-down timer to a value of the attribute defining the periodicity of the heartbeat notifications.

14. The apparatus according to claim 13, wherein the information comprising the one or more attributes received from the first entity further comprises:
    attributes turning on the emission of the heartbeat notifications.

15. The apparatus according to claim 12, wherein the computer program code is further configured to, when executed by the at least one processor, cause the apparatus to:
    reconfigure the subscription based upon the heartbeat notification.

16. The apparatus according to claim 11, wherein the first entity comprises a management service consumer.

17. The apparatus according to claim 11, wherein the apparatus comprises one of a management service producer, a network function, a network element or a management function.

18. The apparatus according to claim 11, wherein said second entity comprises a subscriber, a network function, a network element or a management function.

19. The apparatus according to claim 11, wherein the computer program code is further configured to, when executed by the at least one processor, cause the apparatus at least to:
    when the information comprising the one or more attributes received from the first entity comprises an identification of heartbeat notification information to be deleted,
    delete the heartbeat notification information identified by the identification; and
    stop the emission of the heartbeat notifications.

20. The apparatus according to claim 11, wherein the computer program code is further configured to, when executed by the at least one processor, cause the apparatus at least to:
    when the information comprising the one or more attributes received from the first entity comprises values for turning off the emission of heartbeat notifications, stop the emission of heartbeat notifications according to the values.

21. The method according to claim 11, wherein the computer program code is further configured to, when executed by the at least one processor, to cause the apparatus at least to:
    when the information comprising the one or more attributes received from the first entity comprises values for scheduling the emission of heartbeat notifications, suspend the emission of the heartbeat notifications according to the values.

22. A non-transitory computer-readable medium comprising program instructions stored thereon, which, when executed by an apparatus, cause the apparatus to:
    receive, from a first entity, information identifying a subscription and information comprising one or more attributes associated with the subscription, wherein the one or more attributes relate to management of an emission of heartbeat notifications at the second entity for the subscription;
    associate the one or more attributes with the subscription after the receiving;
    associate the one or more attributes with a communication channel between the apparatus and a second entity relating to the subscription; and
    start the emission of the heartbeat notifications from the apparatus to the second entity according to the information identifying the subscription and the information comprising the one or more attributes received from the first entity;
    wherein the first entity, the second entity, and the third entity are different entities.

23. The non-transitory computer-readable medium of claim 22, wherein the information comprising the one or more attributes received from the first entity comprises at least one of:
    attributes defining a periodicity of the heartbeat notifications of the emission;
    attributes scheduling the emission of the heartbeat notifications; or
    attributes specifying an address that the heartbeat notifications are to be sent to.

* * * * *